United States Patent

Najvar

[15] 3,669,911
[45] June 13, 1972

[54] PROCESS AND COMPOSITIONS FOR MAKING POROUS LOW DENSITY THERMOSET RESINS FROM WATER-IN-RESIN EMULSIONS

[72] Inventor: Daniel J. Najvar, Lake Jackson, Tex.
[73] Assignee: The Dow Chemical Company, Midland, Mich.
[22] Filed: Sept. 26, 1969
[21] Appl. No.: 861,460

[52] U.S. Cl..................260/2.5 N, 260/2.5 EP, 260/2.5 L, 260/29.2 UA, 260/29.2 EP, 260/29.6 ME, 260/29.6 WQ, 260/823, 260/837 R, 260/861
[51] Int. Cl.................................C08g 53/08, C08f 47/08
[58] Field of Search..............260/2.5 N, 2.5 L, 29.6 ME, 260/823, 29.2 UA, 29.6 WQ, 837 R, 861, 2.5 EP

[56] References Cited

UNITED STATES PATENTS

| | | | |
|---|---|---|---|
| 3,442,842 | 5/1969 | Von Bonin | 260/29.6 WQ |
| 3,522,036 | 7/1970 | Vest et al. | 260/878 B |
| 2,505,353 | 4/1950 | Fisk | 260/2.5 M |
| 2,674,619 | 4/1954 | Lundsted | 260/31.4 |
| 3,256,219 | 6/1966 | Will | 260/2.5 N |

Primary Examiner—Murray Tillman
Assistant Examiner—Wilbert J. Briggs, Sr.
Attorney—Griswold & Burdick, H. L. Aamoth and Albin R. Lindstrom

[57] ABSTRACT

The difficulty in readily removing water from cured water-in-thermosettable resin emulsions has been overcome by adding to the emulsion from about 0.005 to 10 parts per 100 parts of emulsion of a polyalkylene oxide block copolymer, nonionic surfactant wherein the hydrophobe portion of the nonionic surfactant has a molecular weight of at least about 1,000. Dewatering of the cured emulsion may be readily effected even at ambient temperatures and at elevated temperatures without cracking or damage to the porous thermoset resin.

30 Claims, No Drawings 3,669,911

PROCESS AND COMPOSITIONS FOR MAKING POROUS LOW DENSITY THERMOSET RESINS FROM WATER-IN-RESIN EMULSIONS

BACKGROUND OF THE INVENTION

This invention relates to thermosettable resin compositions and a process for making low density, porous thermoset resins. More specifically it relates to water-in-resin emulsions, containing certain nonionic surfactants, which may be cured and the water readily removed therefrom.

Porous plastics may be produced by a variety of processes known to the art, but relatively little is known about making porous thermoset resins since thermosettable resins are not readily adaptable to the known processes.

An approach of some merit to this problem would be the preparation of water-in-resin emulsions from thermosettable resins, curing the emulsion and then removing the water. The preparation of such emulsions with unsaturated polyesters has been described in U.S. Pat. No. 2,505,353 and later in U.S. Pat. No. 3,244,772 and in U.S. Pat. No. 3,256,219. However, formulations which are stable enough that they may be cured without inversion of the emulsion are usually difficult to dewater or are unpredictable as to their dewaterability.

Recently certain unsaturated polyesters have become commercially available which are proposed for use in making water-in-resin emulsions. However, the cured emulsion is difficult to dewater and if heat is applied to increase the amount of water removed the thermoset resin cracks. This is a common and a principal problem with this type of resin emulsion in that only a limited amount of water is removable at ambient temperature and the thermoset resin cracks if heat is applied to remove more water or accelerate the rate of water removal.

SUMMARY OF THE INVENTION

Accordingly the present invention provides for a method and compositions whereby thermosettable unsaturated polyester resins and vinyl ester resins may be formed into water-in-resin emulsions, cured to a thermoset resin and readily dewatered to form a porous, low density thermoset resin having many new uses since it may be handled much like wood in that it can be sawed, drilled, nailed, retain screws, etc.

The invention comprises the addition of about 0.005 to about 10 parts per 100 parts of emulsion of certain nonionic polyalkylene oxide block copolymer surface active agents during the preparation of the emulsion. The hydrophobic group of said surface active agent must have a minimum molecular weight of at least about 1,000, and preferred surfactants include those prepared from a low molecular weight mono- or difunctional initiator. After curing, the thermoset resin emulsion loses water even at ambient temperatures and is readily dewatered at elevated temperatures without cracking or damage to the porous resin.

DETAILED DESCRIPTION OF THE INVENTION

The advantages and benefits of this invention are obtained only by the use of certain nonionic surface active agents. For purposes of this invention suitable surfactants include the polyalkylene oxide block copolymers as described by I. R. Schmolka in Chapter 10 of "Nonionic Surfactants," Vol. 1, edited by M. J. Schick, published by Marcel Dekker, Inc., New York (1967). More specifically, said surfactants include block copolymers prepared from low molecular weight mono- and polyfunctional initiators wherein the hydrophobic group has a minimum molecular weight of at least about 1,000.

The block copolymer nonionic surfactants include:

1. block copolymers formed by the addition of one alkylene oxide to an initiator followed by the addition of a different alkylene oxide,
2. heteric-block copolymers prepared by the addition of an alkylene oxide to an initiator followed by reaction of a mixture of alkylene oxides or copolymers in which the sequence of addition is reversed, and
3. heteric copolymers in which an initiator is reacted with a mixture of alkylene oxides followed by reaction with a different mixture of alkylene oxides or a mixture having different proportions of alkylene oxides.

The initiator may be inorganic or organic and contains at least done reactive hydrogen. Preferably it is a low molecular weight alcohol or glycol.

The preparation of such polymers is well known and is described in said Chapter 10 as well as in various patents. Since the details of preparations are readily available to and known by the art, such will not be included herein.

Particularly suitable block copolymer nonionic surfactants include the mono-initiated block heteric copolymers wherein the hydrophobic group has a minimum molecular weight of about 1,000, and preferably a molecular weight of about 1,000 to 2,000, wherein the initiator is an aliphatic monohydric alcohol containing from one to about eight carbons. Especially preferred from this group of surfactants are those wherein the initiator is reacted with a mixture of propylene oxide and ethylene oxide in the weight ratio of about 95:5 to about 85:15, respectively, to form the hydrophobic group followed by reaction with ethylene oxide to form the hydrophylic group. The hydrophylic group comprises from about 44 to 55 weight percent of the weight of the surfactant. In general said surfactants are prepared by reacting a mixture of ethylene and propylene oxide with the initiator in a liquid phase containing the catalyst under known oxyalkylation conditions of temperature, catalysts and concentrations thereof, etc followed by addition of the ethylene oxide. The product is neutralized and impurities removed by extraction and/or heating to remove volatiles. U.S. Pat. No. 3,078,315 may be consulted for further preparative details.

Another group of particularly suitable block copolymer nonionic surfactants are the difunctional initiated all block copolymers made by the sequential addition of propylene oxide to an initiator such as propylene glycol followed by reaction with ethylene oxide. The reaction is generally run at about 120° C using anhydrous sodium hydroxide as a catalyst. The hydrophobic group should have a molecular weight of at least about 1,000, preferably about 1,750 to 3,250, and the polyoxyethylene (hydrophilic) group should comprise from about 60 to 90 weight percent of the block copolymer. The more preferred surfactants contain about 80 weight percent of polyoxyethylene. Such surfactants and their preparation are disclosed in U.S. Pat. No. 2,674,619 which may be consulted for further details.

For the preparation of said surface active agents propylene oxide and ethylene oxide are the preferred alkylene oxides with propylene oxide providing hydrophobic properties and ethylene oxide hydrophylic properties. Other higher alkylene oxides such as butylene oxide or the like may be used in place of the propylene oxide or to partially replace same.

While certain preferred nonionic surfactants prepared from either a monofunctional or a difunctional initiator have been described polyalkylene oxide block copolymers prepared from higher functional initiators such as glycerine, pentaerythritol and the like may also be used with this invention.

Effective proportions of said nonionic surfactant in the emulsion range from about 0.005 parts to about 2 parts per 100 parts of emulsion. While there is no particular advantage higher proportions up to about 10 parts of nonionic surfactant may be used, however the emulsion becomes increasingly thixotropic as the proportion of surfactant increases above about 5 parts.

Other surfactants may be used in combination with the polyalkylene oxide block copolymer nonionic surfactants provided the above proportions are present in the emulsion. A wide variety of cationic, anionic or other nonionic surfactants may be used in combination with said block copolymer nonionic surfactant and may be used to control or reduce the thixotropic nature of the emulsion. The other surfactants may be used effectively in proportions up to about 3 parts per 100 parts of emulsion. Larger proportions may be used but there is no advantage in doing so.

The unusual and unexpected results obtained with the polyalkylene oxide block copolymer nonionic surfactants of this invention are to be contrasted with the inability of a large number of other nonionic surfactants to provide similar results. It has been determined by laboratory testing that the following nonionic surfactants which are all separately described in said text book, "Nonionic Surfactants," are inoperative: polyoxyethylene alkyl phenols, polyoxyethylene ethers of fatty alcohols, polyoxyethylene esters of fatty acids, polyoxyethylated alkylamines and alkylamides and the like. The above inoperative nonionic surfactants may be distinguished from the useful nonionic surfactants of this invention in that they all are prepared from a high molecular weight initiator which also comprises the hydrophobic portion of the surfactant whereas with this invention the block copolymer initiator is a low molecular weight compound. It is not known why this difference produces the above results.

The water-in-resin emulsions of this invention may be made in different ways but the usual procedure involves adding the block copolymer surfactant to the resin in an appropriate container and then adding the water slowly to the resin with sufficient stirring to form a stable emulsion. As with any emulsions, stability is dependent on applying sufficient shear in its preparation to form small droplets of the dispersed phase (water, in this instance). Generally, a droplet or particle size of about 1μ or less is preferred. However, stable emulsions with dispersed particle sizes up to 10–30μ and even larger may be prepared. A variety of mechanical agitating, stirring or homogenizing devices are well known to the trade for the preparation of such emulsions. The temperature of emulsification can vary widely but is usually between about 30° and 150° F. No advantage is found in using higher temperatures and in instances where the thermosettable resin contains a copolymerizable monomer such as styrene and the like high temperatures which might volatilize the monomer should be avoided.

While the emulsions may be cured by exposing them to ionizing radiation, more frequently it is advantageous to add a free radical generating catalyst, usually to the resin phase before emulsification, and heat to accelerate the cure of the emulsion. A variety of such catalysts are available including peroxides, persulfates, azo catalysts and the like. Benzoyl peroxide, peroxide, lauroyl peroxide, t-butyl hydroperoxide, t-butyl perbenzoate, methyl ethyl ketone peroxide, potassium persulfate, azobisisobutyronitrile and like catalysts are typical. Normal catalyst levels range from about 0.1 to about 5 weight percent and the emulsion may be cured at temperatures up to about 200° F or even higher. More rapid curing may be obtained by adding effective amounts of accelerating agents such as lead or cobalt naphthanate, N,N-dimethyl aniline and the like.

Advantageously the addition of small amounts of paraffin wax to the resin phase assists in providing tack free surfaces of cast parts due to exclusion of air. A wax level of about 0.07 to 0.25 parts per 100 parts of emulsions is sufficient. Conveniently the wax is soluble in styrene and other monomers frequently admixed with the resins.

Following cure of the resin emulsion the thermoset resin may be dehydrated merely by standing at room temperature. Dehydration is dependent on both temperature and thickness of the resin, for example, a 1 inch thick resin might take about 15 days at 75° F to dehydrate but only takes about 2 to 3 hours at 400° F. Temperatures up to about 450°–500° F may be used if desired. Even at these elevated temperatures the thermoset resins of this invention can be substantially dehydrated without cracking or damage to the resin. Vacuum conditions may also be used in dehydrating the thermoset resin.

By low density porous resin it is meant porous thermoset resins having a density less than the density of a cured water-in-resin emulsion by virtue of substantially removing the water contained in the cured emulsion.

The density of the dehydrated resins is dependent on the amount of water used in the preparation of the resin. At low water levels of about 10–20 weight percent based on the emulsion weight the density of a substantially dehydrated thermoset resin may range from about 50 to 60 lbs/cu.ft. At higher water levels of about 70–80 weight percent the density of substantially dehydrated thermoset resin ranges from about 10 to 20 lbs/cu.ft. Accordingly, the water-in-resin emulsions are prepared to contain from about 30 to 80 weight percent water based on the weight of the emulsion and correspondingly from about 70 to 20 weight percent of a thermosettable resin as herein defined. Preferably the emulsion contains from about 30 to 70 weight percent water and 70 to 30 weight percent resin.

By thermosettable resin it is first of all meant to include unsaturated polymerizable resins which are admixed with copolymerizable monomers. The admixture of monomers is desirable in order to reduce the overall resin costs, but equally as important the final properties of the cured resin may be varied by the choice of the monomer and the amount used. Generally the unsaturated polymerizable resin comprises from about 30 to 80 weight percent of the mixture with the balance of about 70 to 20 weight percent comprising said monomer or mixtures of same.

A wide selection of copolymerizable monomers is available and include alkenyl aromatics, esters of acrylic or methacrylic acid, vinyl esters, vinyl acids, allyl and methallyl half esters and diesters of dicarboxylic acids, amide monomers and the like. Typical of said monomers are styrene, vinyl toluene, α-methyl styrene, halogenated styrenes such as p-chlorostyrene, methyl styrene, halogenated styrenes such as p-chlorostyrene, alkyl substituted aromatics such as t-butyl styrene, methyl methacrylate, ethyl acrylate, butyl acrylate, cyclohexyl methacrylate, α-ethyl hexyl acrylate, octyl methacrylate, vinyl acetate, acrylonitrile, acrylic acid, methacrylic acid, acrylamide and the like.

Two distinct classes of unsaturated polymerizable (thermosettable) resins are contemplated by this invention. The first class comprises the well known unsaturated polyester resins which are generally prepared by the condensation of a polycarboxylic acid with a polyhydric alcohol. In particular dibasic acids or the anhydrides thereof and glycols are the preferred reactants. The unsaturated sites in the polyester are obtained by using an unsaturated dibasic acid or anhydride. Depending on the properties desired mixtures of both saturated and unsaturated polycarboxylic acids or anhydrides are commonly used.

The unsaturated polyester is typified by a regular repeating unit in the polymer chain having a formula such as

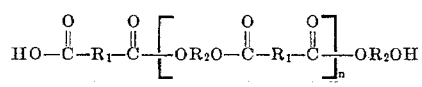

where $R_1$ represents the residual organic portion of a dicarboxylic acid, $R_2$ represents the residual organic portion of a glycol and n is an integer ranging up to 50 or 100 or even higher. Thus a polyester has a regular distribution of ester groups along the polymer chain. Moreover, if the polyester is prepared from a mixture of maleic and phthalic acids the $R_1$ groups would be a random mixture of $-CH_2=CH_2-$ and phenyl groups along the chain. Such polyesters, their preparation and a description of a variety of acids, anhydrides, glycols etc which may be used to prepare same are found in "Handbook of Reinforced Plastics of the SPI" by S. Oleesky and G. Mohr, Reinhold Publishing Corp., N.Y. 1964, at pages 13–55. Since such resins and their preparation are fully described in the above book as well as in a host of patents, journals and other reference books, the details thereof need not be repeated herein.

Generally, the unsaturated polyester contains unreacted acid groups even when an excess of the glycol etc is used. In the preparation of the resin the condensation reaction is continued until some predetermined acid number is reached. Most commercially available unsaturated polyester resins contain both free acid groups and hydroxyl groups.

Maleic anhydride and various glycols such as ethylene glycol, propylene glycol, diethylene glycol and the like are frequently used. In addition fumaric acid, itaconic acid or their anhydrides may also be used. A variety of saturated acids and anhydrides may be used in combination with an unsaturated anhydride etc and include phthalic anhydride, isophthalic acid, tetrabromo phthalic acid, clorendic anhydride, adipic acid and the like. It is to be understood that unsaturated polyesters prepared by replacing the glycol with an appropriate alkylene oxide, for example propylene oxide in place of propylene glycol, also are contemplated herein.

A second class of unsaturated polymerizable resins contemplated by this invention are the newer vinyl ester resins. Vinyl ester resins are prepared by reacting about equivalent quantities of an unsaturated monocarboxylic acid such as methacrylic acid with a polyepoxide resin. With methacrylic acid and a diglycidyl ether of bisphenol A the vinyl ester resin has the formula

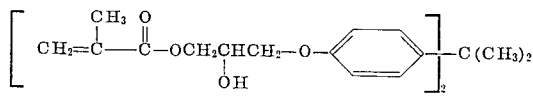

Thus the vinyl ester resin is characterized in having terminal vinylidene groups as opposed to acid or hydroxyl groups found in polyester resins, and also contain hydroxyalkyl ester groups generally adjacent the vinylidene group.

Such resins which are herein called vinyl ester resins are described in U.S. Pat. No. 3,367,992 where the unsaturated monocarboxylic acid is an α-hydroxyalkyl acrylate or methacrylate half ester of a dicarboxylic acid; in U.S. Pat. No. 3,066,112; in U.S. Pat. No. 3,179,623; in U.S. Pat. No. 3,256,226 where the molecular weight of the polyepoxide is increased by reaction of same with a dicarboxylic acid; in U.S. Pat. No. 3,301,743; in U.S. Pat. No. 3,377,406 and elsewhere.

As shown in the above references a variety of polyepoxide resins may be used in the preparation of vinyl ester resins. Useful polyepoxides include polyglycidyl ethers of polyhydric phenols and polyhydric alcohols, epoxy novolac resins, epoxidized diolefins or fatty acids or drying oils provided the polyepoxide contains more than one oxirane group per molecule. As previously indicated the polyepoxides also include those wherein the molecular weight is increased by reaction with a difunctional compound such as a dicarboxylic acid.

Preferred polyepoxides are the polyglycidyl ethers of polyhydric phenols and polyhydric alcohols, the epoxy novolac resins and mixtures thereof wherein the epoxide equivalent weight may vary from about 150 up to about 6,000. Said polyepoxides are made by reacting at least about two moles of an epihalohydrin with 1 mole of a polyhydric phenol, polyhydric alcohol or novolac resin and a sufficient amount of a caustic alkali to combine with the halogen of the halohydrin. The products are characterized in having more than one epoxide group per molecule.

Unsaturated monocarboxylic acids useful in preparing vinyl ester resins include acrylic acid, methacrylic acid, halogenated acrylic or methacrylic acids, cinnamic acid, and the like and mixtures thereof. Also included are the 2-hydroxyalkyl acrylate or methacrylate half esters of dicarboxylic acids as described in U.S. Pat. No. 3,367,992 wherein the hydroxyalkyl group preferably has from two to six carbon atoms. Typical half esters include the 2-hydroxyethyl acrylate half ester of maleic acid, the 2-hydroxypropyl methacrylate half ester of phthalic acid and the like. Either saturated or unsaturated dicarboxylic acid half esters may be used. Conveniently the half esters are prepared by reacting about 1 mole of said hydroxyalkyl acrylate or methacrylate with 1 mole of a dicarboxylic acid anhydride. Further details may be found in U.S. Pat. No. 3,367,992.

Various catalysts may be used in the preparation of vinyl ester resins. Catalysts include tertiary amines such as tris(dimethylaminomethyl) phenol, onium catalysts, triphenyl stibine and triphenyl phosphine, $CrO_3$ and the like. Usually hydroquinone or other like polymerization inhibitors are added to prevent polymerization during the preparation of the resin.

Also included within the definition of vinyl ester resins are those vinyl ester resins which have been further reacted with a dicarboxylic acid anhydride wherein said anhydride reacts with the hydroxyl group formed in the first step reaction of the monocarboxylic acid with the polyepoxide resin (see prior vinyl ester resin formula). The proportions of anhydride may vary from about 0.05 to 0.1 mole up to 1 to 1.2 moles or higher if necessary per mole of hydroxyl group. These modified vinyl ester resins have greatly improved corrosion resistance among other properties.

The following non-limiting examples will illustrate further the present invention. All percentages are by weight unless otherwise specified.

EXAMPLE 1

Vinyl ester resin A contains about 45 percent styrene monomer and about 55 percent of a resin prepared by reacting about 2 equivalents of methacrylic with about 1 equivalent of a polyglycidyl ether of bisphenol A (DER 331) having an epoxide equivalent weight of about 186–192 and about 1 equivalent of a higher molecular weight polyglycidyl ether of bisphenol A (DER 661) having an epoxide equivalent weight of about 475–575. After this first stage reaction is substantially completed the resin is post reacted with about 3 percent of maleic anhydride. The resin is then diluted with styrene to the above composition.

From the above resin two identical emulsions were prepared by placing 1,500 gms of said resin plus benzoyl peroxide as a catalyst in a 1 gallon container and then adding 1,500 grams of water to the resin using a Cowles dissolver operated at 3–4,000 rpm to prepare the emulsion. After each of the emulsions were prepared 0.2 percent of a curing promoter, N,N-dimethyl aniline (DMA) was added. The emulsions were then poured into a 2 inch cube mold and cured. AFter cure the samples were placed in a 250° F forced draft oven for 3 hours, removed and the weight loss determined.

The two emulsions differed only in that the first emulsion contained 15 grams of benzoyl peroxide and the second emulsion contained 30 gms of a commercial benzoyl peroxide catalyst (U.S. Peroxygen catalyst BZQ-55) which contains 55 percent benzoyl peroxide, 35–40 percent of butyl benzyl phthalate and 5–10 percent of a nonionic surfactant (Tergitol XD, Union Carbide). Tergitol XD is a heteric-block surfactant prepared by reacting a mixture of propylene and ethylene oxides with a low molecular weight monohydric aliphatic alcohol followed by reaction with ethylene oxide. The nonionic surfactant is a white, soft solid having a cloud point of 60°–70° C (0.5 percent aqueous solution) and a pH of 6 (0.1 percent aqueous solution).

The emulsions sample cured with the Tergitol XD present lost 50 percent of its weight under the above drying conditions whereas the other emulsion lost only 3.7 percent of its weight under similar conditions. Later tests proved the above results are due to the surfactant and not to the phthalate compound.

Two additional comparative tests, similar to the above, were also made in which the cured emulsions were dried merely by standing at 75° F. In one week the emulsion containing Tergitol XD lost 50 percent of its weight whereas the other sample without the surfactant lost only 1–2 percent of its weight.

EXAMPLE 2

A low density porous resin with good tack-free surfaces was prepared by making an emulsion in a manner similar to Example 1 from 1,000 grams of resin A, 25 grams of BZQ-55 catalyst, 1500 grams of water and 25 grams of a paraffin wax (4 percent) styrene solution. The emulsion was promoted with 0.2 percent DMA and cured. The part was placed in a 250° F forced draft oven and dried for 4 hours. The part lost 61 percent of its weight, had a density of about 29.9 lbs/cu.ft., under compression had a yield strength of 2,080 psi and a compressive strength of 6,000 psi at 40 percent of its original thickness without failure.

Three additional emulsions were prepared similar to the above in which the water content was, respectively, 40 percent, 50 percent and 60 percent. After curing the densities were measured after drying at 176°–400° F and other properties determined.

|  | Emulsion Prepared With | | |
|---|---|---|---|
|  | 40% water | 50% water | 60% water |
| Density,lbs/cu.ft. | 42.8 | 34.7 | 29.3 |
| Flexural Strength,psi | 4700 | 2800 | 1820 |
| Flexural Modulus,psi | $1.65 \times 10^5$ | $1.14 \times 10^5$ | — |
| Holding Power,lb./in, to |  |  |  |
| Number 6 Screw | 757 | 522 | 400 |
| Number 8 screw | 867 | 450 | 267 |

EXAMPLE 3

Similar results to that of Example 1 were found when the vinyl ester resin A was replaced with an unsaturated polyester resin. A proprietary, commercially available unsaturated polyester resin (WEP–26, Ashland Chemical Co.) proposed for use in making water-in-resin emulsions was emulsified with an equal weight of water and 1 percent BZQ–55 catalyst. The emulsion was promoted by the addition of 0.2 percent DMA and the emulsion cured in a statuary mold. The molded part was then dried in a 250° F oven for 20 hours losing about 50 percent of its weight without cracking or splitting. Another emulsion prepared in the same manner with dry benzoyl peroxide (without Tergitol XD) cracked and split during drying.

EXAMPLE 4

Tests to show that the phthalate type compounds are ineffective were made using resin A. Two emulsions were made with equal weights of resin and water containing about 0.5 percent dry benzoyl peroxide. In one case 0.5 percent dioctyl phthalate was added and in the other 0.5 percent of dibutyl phthalate. Both emulsions, promoted with about 0.2 percent DMA were cured and dried as before. After 20 hours the first emulsion had lost only 10 percent of its weight and the second only 12.8 percent. Thus, phthalate compounds such as used in these tests and which are ordinarily used as plasticizers were not effective in preparing cured emulsions which could be substantially dewatered. Similar results were found when butyl benzyl phthalate was used.

EXAMPLE 5

The effectiveness of Tergitol XD was demonstrated by preparing two emulsions from resin A containing 50 percent water and 0.5 percent dry benzoyl peroxide. To one emulsion was added 0.8 percent Tergitol XD and to the other 0.8 percent Tergitol NPX (a nonyl phenyl polyethylene glycol nonionic surfactant).

Both emulsions were cured as before and dried at 176° F for 16 hours. The sample containing Tergitol XD lost 45.2 percent of its weight whereas the other sample lost only 3.65 percent. These tests show that the dewaterability is due to the Tergitol XD and that the other type of nonionic surfactant (nonyl phenyl hydrophobe) was ineffective.

EXAMPLE 6

Vinyl ester resin B contains about 45 percent styrene and 55 percent of a resin prepared by first reacting 12 lbs of methacrylic acid with 37.4 lbs of a polyglycidyl ether of bisphenol A (DER 337) having an epoxide equivalent weight of 230–250 in the presence of 4.9 gms of hydroquinone and 37.4 gms of DMP–+catalyst (tris(dimethylaminomethyl)phenol). The resin was then further reacted with 1.9 lbs of maleic anhydride and then mixed with 41.5 lbs of styrene.

An emulsion containing 60 percent water was prepared as before with 1,200 grams of resin B, 1,800 grams of water, 14.4 grams of BZQ–55 catalyst and 45 grams of a 4 percent paraffin wax solution in styrene. The resulting emulsion had a very low viscosity but with the addition of 0.2 percent N,N-dimethyl-p-toluidine (DMT) it cured readily. A cured sample was placed in a 250° F oven and in one hour lost 22.6 percent of its weight. With continued heating the sample had a weight loss of 43 percent after 3 hours; 56 percent after 5 hours; 58 percent after 6 hours and 61 percent after 8.5 hours.

Another emulsion was prepared with 30 parts of resin B, 70 parts water, 0.2 part Tergitol XD, 0.5 part dry benzoyl peroxide and 1 part saran microspheres. The emulsion was cured with 0.4 part DMA and dried for 16 hours at 250° F. A weight loss of 71.7 percent was found and the porous resin had a density of 17.7 lbs/cu.ft.

EXAMPLE 7

Vinyl ester resin C was prepared similarly to resin B except that the post reaction with maleic anhydride was omitted.

An emulsion containing 70 percent water was prepared from 450 grams of resin C, 1,050 grams of water, 4.5 grams of dry benzoyl peroxide, 30 grams of a 4 percent paraffin wax solution in styrene and 7.5 grams of Tergitol XD.

A second emulsion was prepared as above except that 0.4 percent DMA was added and 2 grams of an anionic surfactant, Tergitol No. 4 (a sodium sulfate derivative of 7-ethyl-2-methyl-4-undecanol). The emulsions were cured in a round tray, one-half inch thick and in 3 hours at 250° F lost 72 percent of their weight (density was 21.9 lbs/cu.ft.).

The viscosity of the emulsions was checked prior to the addition of DMA and illustrate the effectiveness of another surfactant to reduce the viscosity of the emulsion.

| Brookfield RVT | Viscosity in cps | |
|---|---|---|
| No. 5 Spindle, | Tergitol XD + | Tergitol XD |
| RPM | anionic | only |
| 100 | 2200 | 3960 |
| 50 | 2880 | 5840 |
| 20 | 4400 | 9600 |
| 10 | 6400 | 15200 |
| 5 | 9600 | 2400 |
| 2.5 | 14400 | 38400 |
| 1 | 28000 | 74800 |

Similar results were obtained when the Tergitol XD was replaced by Tergitol XH (a higher molecular weight nonionic, chemically similar to Tergitol XD, but having a higher cloud point and increased water solubility than Tergitol XD).

EXAMPLE 8

The previous examples used a polyalkylene oxide block copolymer nonionic surfactant prepared from a monofunctional initiator (an aliphatic monohydric alcohol). The emulsions of this example were prepared to contain 0.3 percent of difunctional initiated block copolymers prepared by condensing propylene oxide with propylene glycol followed by reaction with ethylene oxide. Such nonionic surfactants are available commercially under the name of "Pluronic." All the Pluronics used contained about 80 percent of polyoxyethylene as the hydrophilic unit and had varying hydrophobe molecular weights as follows: F–38, 950 M.W.; F–68, 1750 M.W.; F–98, 2750 M.W.; and F–108, 3250 M.W.

Emulsions were prepared with resin A to contain 50 percent water to which was added 0.5 percent benzoyl peroxide and 0.3 percent of one of the Pluronic nonionic surfactants. Then 0.2 percent DMA was added and the emulsion cured followed by heating at 250° F for 16–72 hours. The emulsion with Pluronic F–38 lost 35 percent of its weight after 72 hours and was slightly cracked. Each of the emulsions containing Pluronic F–68, F–98 and F–108 all dewatered readily, losing 52 percent of their weight, and did not crack. Similar results are obtained if the resin is prepared with acrylic acid in place of methacrylic acid.

EXAMPLE 9

Vinyl ester resin D contains about 25 percent styrene and about 75 percent of a resin prepared as before by reacting 4 equivalents of methacrylic acid, 3 equivalents of an epoxy novolac (DEN 438) having an epoxide equivalent weight of 175-182 and 1 equivalent of DER 331.

An emulsion was prepared from 1,100 grams of resin D, 400 grams of styrene, 1,500 grams of water, 60 grams of a 4 percent wax solution in styrene and 30 grams of BZQ-50 catalyst (50 percent benzoyl peroxide). The emulsion had a viscosity of 900 cps and when cured with 0.2 percent DMT it exothermed to 177° F. After drying at 250° F for 6 hours the cured emulsion lost 52 percent of its weight and the resulting porous resin had a 264 psi, heat distortion temperature of 257° F. The resin did not crack or craze after heating at 250° F for 80 hours.

EXAMPLE 10

Vinyl ester resin E was prepared similarly to resin D except that the resin was post reacted with about 2 percent of maleic anhydride and was diluted to about 50 percent styrene.

An emulsion was prepared from 120 grams of resin E, 30 grams of acrylonitrile, 350 grams of water and 6 grams of BZQ-50 catalyst. The emulsion had a viscosity of 4,300 cps. When the emulsion was mixed with 0.2 percent DMT it gelled in about 3 ½ minutes.

The development of hardness during the cure stage was tested with a Labline Penetrometer Timer which measures on a dial the depth of penetration of a needle into the sample. The needle is weighted by a 50 gram mass and penetrates for 5 seconds.

| Time From Add'n of DMT | Dial Reading |
|---|---|
| 9 min. | 160 |
| 10 | 148 |
| 11 | 51 |
| 13 | 2 |
| 14 | 0 |

The sample was then placed in a 250° F oven overnight and it lost 72 percent of its weight without cracking or splitting.

Similar results to the previous vinyl ester emulsion have been obtained when the styrene monomer was replaced by butyl acrylate at monomer levels up to 40 percent based on resin weight.

EXAMPLE 11

Vinyl ester resin F contains 40 percent styrene and 60 percent of a resin prepared by first reacting 28.1 lbs of a flame retardant epoxy resin (DER 542, contains about 44 percent Br) with 12.9 lbs of tetrabromo bisphenol A in the presence of 37 grams of ethyl triphenyl phosphonium iodide as catalyst to make a higher molecular weight resin. The mixture was reacted at 168° C for about 1 hour and cooled to 100° C.

The following was then added: 12.5 lbs of DER 542, 9.1 grams of hydroquinone, 6.5 lbs of methacrylic acid and 24 ml of DMP-30 catalyst. The resin was reacted at 110° C until the acid content, —COOH, was about 1 percent. The resin was cooled and blended with styrene.

An emulsion was prepared from 1,500 grams of resin F, 1,500 grams of water, 15 grams of benzoyl peroxide, 7.5 grams of Tergitol XH and 60 grams of a 4 percent wax solution in styrene. The emulsion had a viscosity of about 4,800 cps at 75° F. The emulsion was then cured with 0.2 percent DMT. A 1 inch thick cured sample was heated at 250° F for 16 hours and lost 50.5 percent of its weight (density of 39.6 lbs/cu.ft.).

The samples would not ignite without the aid of a burning match held against the bar. The burn rate was less than 0.1 inches/min. as determined by the Globar Test, ASTM-757-49. The flame would extinguish immediately when removed from the Globar. The resin was self-extinguishing when subjected to the blue tip flame of a propane torch for 1 minute.

EXAMPLE 12

An emulsion was also prepared with a general purpose, commercially available laminating and spray-up polyester resin. The emulsion was prepared from 150 grams of Stepan Polyester 5458 (an orthophthalic-maleic anhydride glycol polyester containing about 42 percent styrene), 150 grams of water, 0.15 gram of Tergitol XD and 3 grams of benzoyl peroxide. The emulsion was quite viscous and thixotropic in nature.

The emulsion was then cured by adding 0.2 percent DMT which resulted in a gel time of 2 minutes. The resin could be removed from the mold in 10-11 minutes and was then heated in a 250° F forced draft oven. After 2 hours and 45 minutes the part had lost 51.3 percent of its weight without cracking or crazing.

For comparison an identical emulsion was prepared as above except that the Tergitol was omitted. Within 1 hour at 250° F the part cracked badly.

Since the water is ultimately removed from the cured emulsion there is no particular advantage in using other aqueous solutions. However, such aqueous solutions (salt solutions, etc) may be used provided they have no adverse effect on the cureability or dewaterability. Other additives may be included in said emulsions such as inert fillers and the like. Commonly used fillers include kaolin clay, $CaCO_3$, silica and the like. For reasons of economics and curing rate the emulsions will usually contain from about 40 to 55 percent monomer. However, as indicated previously both lower and higher levels may be used. Emulsions have been prepared which contain 50 percent styrene and 20 percent acrylonitrile and which dewater readily demonstrating that monomer levels up to 70 percent are practical and operable.

This invention is especially valuable in that porous thermoset resins are prepared which have many of the characteristics of wood and may be used in place of wood in a variety of areas such as furniture, cast wall decorations, statuary etc. and has utility in many other areas such as filters, coatings, insulation, core material for building panels, boat construction, binding material for aggregate materials such as gravel, vermiculite, etc., and the like. The resin may be sawed, nailed, painted, stapled, etc.

Unlike water extended polymers where the cells are non-communicating, once the water has been removed from the product of the present invention, the foam-like material has excellent dimensional stability and does not continue to shrink due to weight loss even after prolonged exposure to elevated temperatures.

It will be understood that the present invention is not limited to the specific details described above but may embody various modifications insofar as they are defined in the following claims.

What is claimed is:

1. A process for preparing low density, porous thermoset resins which comprises
   a. forming a water-in-resin emulsion comprised of about 30 to 80 parts of water, about 70 to 20 parts of a thermosettable resin and about 0.005 to 10 parts per 100 of said emulsion of a polyethylene oxide-polyalkylene oxide block copolymer nonionic surface active agent having a polyalkylene oxide hydrophobic group with a molecular weight of at least about 1,000;
   b. curing said emulsion to thermoset said resin; and
   c. substantially dehydrating said thermoset resin; wherein said thermosettable resin comprises from about 30 to 80 parts of a resin selected from the group consisting of an unsaturated polyester resin, a vinyl ester resin and mixtures thereof and from about 70 to 20 parts of a copolymerizable monomer or mixtures thereof and wherein said vinyl ester resin is prepared by reacting about equivalent amounts of an unsaturated monocarboxylic acid with a polyepoxide resin.

2. The process of claim 1 wherein the parts of said nonionic surfactant range from about 0.005 to about 2 parts.

3. The process of claim 1 wherein said surfactant is prepared from monofunctional initiator.

4. The process of claim 3 wherein said nonionic surface active agent hydrophobic group comprises a heteric oxyethylene-oxypropylene chain ether of a monohydric alcohol containing from one to eight carbon atoms wherein the weight ratio of oxypropylene to oxyethylene ranges from about 95:5 to 85:15, respectively.

5. The process of claim 4 wherein about 44 to 55 weight percent of said surface active agent comprises a polyoxyethylene hydrophilic group.

6. The process of claim 4 wherein said hydrophobic group has a molecular weight of about 1,000 to 2,000.

7. The process of claim 1 wherein said surfactant is prepared from a difunctional initiator.

8. The process of claim 7 wherein said difunctional initiator is propylene glycol, said nonionic surfactant hydrophobic group is a polyoxypropylene group and said surfactant comprises from 10 to 80 weight percent of a polyoxyethylene hydrophilic group.

9. The process of claim 8 wherein said hydrophobic group has a molecular weight of about 1,750 to about 3,250.

10. The process of claim 8 wherein said surfactant contains about 80 weight percent of polyoxyethylene.

11. The process of claim 1 wherein said emulsion further comprises from about 0.07 to 0.25 parts of paraffin wax per 100 parts of said emulsion.

12. The process of claim 1 wherein said emulsion is prepared at a temperature of about 30° to 150° F.

13. The process of claim 1 wherein said thermoset resin is dehydrated at a temperature up to about 500° F.

14. The process of claim 1 wherein said emulsion further comprises up to 3 parts per 100 parts of said emulsion of a surface active agent different from said nonionic surface active agent.

15. The process of claim 14 wherein said different surface active agent is an anionic surfactant.

16. The thermoset article produced according to the process of claim 1.

17. A thermosettable emulsion containing water as the dispersed phase which comprises from about 30 to 80 parts of water, about 70 to 20 parts of a thermosettable resin and about 0.005 to 10 parts per 100 parts of said emulsion of a polyethylene oxide-polyalkylene oxide block copolymer nonionic surface active agent having a polyalkylene oxide hydrophobic group with a molecular weight of at least about 1,000, wherein said thermosettable resin comprises from about 30 to 80 parts of a resin selected from the group consisting of an unsaturated polyester resin, vinyl ester resin and mixtures thereof and from about 70 to 20 parts of a copolymerizable monomer or mixtures thereof and wherein said vinyl ester resin is prepared by reacting about equivalent amounts of an unsaturated monocarboxylic acid with a polyepoxide resin.

18. The emulsion of claim 17 wherein the parts of said nonionic surfactant range from about 0.005 to about 2 parts.

19. The emulsion of claim 17 wherein said surfactant is prepared from a monofunctional initiator.

20. The emulsion of claim 19 wherein said nonionic surface active agent hydrophobic group comprises a heteric oxyethylene-oxypropylene chain ether of a monohydric alcohol containing from one to eight carbon atoms wherein the weight ratio of oxypropylene to oxyethylene ranges from about 95:5 to 85:15, respectively.

21. The emulsion of claim 20 wherein about 44 to 55 weight percent of said surface active agent comprises a polyoxyethylene hydrophilic group.

22. The emulsion of claim 20 wherein said hydrophobic group has a molecular weight of about 1,000 to 2,000.

23. The emulsion of claim 17 wherein said surfactant is prepared from a difunctional initiator.

24. The emulsion of claim 23 wherein said initiator is propylene glycol, said nonionic surfactant hydrophobic group is a polyoxypropylene group and said surfactant comprises from 60 to 90 weight percent of a polyoxyethylene hydrophilic group.

25. The emulsion of claim 24 wherein said hydrophobic group has a molecular weight of about 1,750 to about 3,250.

26. The emulsion of claim 25 wherein said surfactant contains about 80 weight percent of polyoxyethylene.

27. The emulsion of claim 17 wherein said emulsion further comprises from about 0.07 to 0.25 parts of paraffin wax per 100 parts of said emulsion, 28. The emulsion of claim 17 wherein said emulsion is prepared at a temperature of about 30° to 150° F.

29. The emulsion of claim 15 wherein said emulsion further comprises up to 3 parts per 100 parts of said emulsion of a surface active agent different from said nonionic surface active agent.

30. The emulsion of claim 29 wherein said different surface active agent is an anionic surfactant.

* * * * *

PO-1050
(5/69)

UNITED STATES PATENT OFFICE
CERTIFICATE OF CORRECTION

Patent No. 3,669,911    Dated 13 June 1972

Inventor(s) Daniel J. Najvar

It is certified that error appears in the above-identified patent and that said Letters Patent are hereby corrected as shown below:

Column 2, line 6, delete "done" and insert --one--.

Column 7, line 70, change "DMP-+catalyst" to --DMP-30 catalyst--.

Column 8, the table between lines 33 and 43, change the 5th number in the last column from "2400 to --24000--.

Column 11, Claim 10, line 22, change "claim 8" to --claim 9--.

Signed and sealed this 28th day of November 1972.

(SEAL)
Attest:

EDWARD M. FLETCHER, JR.
Attesting Officer

ROBERT GOTTSCHALK
Commissioner of Patents